United States Patent
Ogawa (10) Patent No.: US 7,754,644 B2
(45) Date of Patent: Jul. 13, 2010

(54) NOBLE METAL PARTICLE AND PROCESS OF PRODUCING THE SAME

(75) Inventor: Ryohei Ogawa, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/991,390

(22) PCT Filed: Sep. 1, 2006

(86) PCT No.: PCT/JP2006/317309

§ 371 (c)(1),
(2), (4) Date: Mar. 3, 2008

(87) PCT Pub. No.: WO2007/029607

PCT Pub. Date: Mar. 15, 2007

(65) Prior Publication Data

US 2009/0156390 A1    Jun. 18, 2009

(30) Foreign Application Priority Data

Sep. 8, 2005    (JP)    ............... 2005-260015

(51) Int. Cl.
*B01J 23/42*    (2006.01)
*B22F 1/02*    (2006.01)
*B22F 9/24*    (2006.01)

(52) U.S. Cl. ............ 502/185; 75/255; 75/228; 75/331; 75/332; 106/1.21; 420/466; 423/22; 429/524; 429/526; 502/101; 516/97

(58) Field of Classification Search ......... 423/1, 423/22; 502/100, 300, 325, 326, 101; 75/255, 75/228, 331, 332; 106/1.21; 420/466; 429/524, 429/526; 516/97
See application file for complete search history.

(56) References Cited

U.S. PATENT DOCUMENTS 5,786,026 A    7/1998    Seko et al.

(Continued)

FOREIGN PATENT DOCUMENTS

JP    9-153366 A    6/1997

(Continued)

OTHER PUBLICATIONS

Colle, V.D. et al. Spontaneous deposition of Ru on Pt (100): Morphological and electrochemical studies. Preliminary results of ethanol oxidation at Pt(100)/Ru, 2003, Journal of the Brazilian Chemical Society, vol. 14 No. 4 , p. 601-609.*

(Continued)

*Primary Examiner*—Wayne Langel
*Assistant Examiner*—Syed Iqbal
(74) *Attorney, Agent, or Firm*—Hamre, Schumann, Mueller & Larson, P.C.

(57) ABSTRACT

The present invention provides a noble metal particle with an improved methanol-oxidation property. This noble metal particle has a platinum particle and ruthenium particles deposited on only part of the surface of the platinum particle. This noble metal particle suitably can be produced by precipitating the ruthenium particles out of the solution so that the ruthenium particles are deposited on only part of the surface of the platinum particle by further adding a ruthenium salt into the solution and reducing the ruthenium salt after the reduction of the platinum salt in the solution essentially is completed. This noble metal particle is suitable as a catalyst to be supported on an electrode of a polymer electrolyte fuel cell typified by a direct methanol fuel cell.

14 Claims, 7 Drawing Sheets

U.S. PATENT DOCUMENTS

| | | | |
|---|---|---|---|
| 6,339,038 | B1 | 1/2002 | Tada et al. |
| 2005/0186129 | A1* | 8/2005 | Miyashita et al. ............. 423/22 |

FOREIGN PATENT DOCUMENTS

| | | |
|---|---|---|
| JP | 2000-000467 A | 1/2000 |
| JP | 2002-102699 A | 4/2002 |
| JP | 2002-231257 A | 8/2002 |
| WO | WO 2004/073090 A | 8/2004 |
| WO | WO 2005/030416 A1 | 4/2005 |

OTHER PUBLICATIONS

Maillard et al., "Ru-Decorated Pt surfaces as model Fuel cell electrocatalysts for CO Electrooxidation", Jun. 2005, Journal of Phys. Chem. 109, p. 16230-16243.*

Colle. V. et al. "Spontaneous Deposition of Ru on Pt (100): Morphological and Electrochemical Studies. Preliminary Results of Ethanol Oxidation at Pt(100)/Ru". Journal of the Brazilian Chemical Society, vol. 14. No. 4. 2003. pp. 601-609.

Arico, A. et al. "Electrochemical analysis of high temperature methanol electro-oxidation at Pt-decordated Ru catalysts" Journal of Electroanalytical Chemistry, vol. 576, 2005, pp. 161-169.

Brankovic, S. "Pt Submonolayers on Ru Nanoparticles A Novel Low Pt Loading, High CO Tolerance Fuel Cell Electrocatalyst", Electrochemical and Solid State Letters, vol. 4, No. 12, 2001, pp. 217-220.

Watanabe, M. et al. "Preparation of Highly Dispersed Pt + Ru Alloy Clusters and the Activity for the Electrooxidation of Methanol", Journal of Electroanalytical Chemistry, vol. 229, 1987, pp. 395-406.

Crabb, E.M. et al. "Effect of Ru surface composition on the CO tolerance of Ru modified carbon supported Pt catalysts", Phys. Chem. Chem. Phys., vol. 6, 2004, pp. 1792-1798.

* cited by examiner

NOBLE METAL PARTICLE AND PROCESS OF PRODUCING THE SAME

TECHNICAL FIELD

The present invention relates to a noble metal particle and a process of producing it, and in particular, to a noble metal particle containing platinum and ruthenium.

BACKGROUND ART

Currently, a noble metal particle is used widely as a catalyst. One of its applications is a catalyst for a fuel cell electrode. Fuel cells are roughly classified by the kind of electrolyte they employ: a fuel cell that operates at a lower temperature, such as a polymer electrolyte fuel cell, an alkaline fuel cell and a phosphoric acid fuel cell; and a fuel cell that operates at a higher temperature, such as a solid oxide fuel cell and a molten carbonate fuel cell. Among them, a polymer electrolyte fuel cell (PEFC), which operates at a lower temperature and has high energy conversion efficiency, is one of the most promising power sources for a high-efficiency power generation system and a next-generation automobile. In particular, a direct methanol fuel cell (DMFC), a kind of PEFC, is compact due to its direct use of methanol as a fuel source and being free from a hydrogen storage tank and a reformer. In addition, this type of fuel cells starts up quickly. Therefore, it is expected as a power source for mobile devices.

A polymer electrolyte fuel cell typified by a DMFC has a structure in which an electrolyte member is sandwiched between an anode and a cathode. A noble metal particle as a catalyst is fixed on the anode and cathode. Platinum mainly is used as such a noble metal.

Hydrogen gas fueled into the anode is decomposed into protons and electrons by a platinum catalyst. Hydrogen supplied to the anode is obtained by reforming hydrocarbon-based fuel such as methane or hydrocarbon-oxide-based fuel such as methanol.

This reformed gas, however, contains a tiny amount of carbon monoxide. Strong bonding of carbon monoxide to adsorption sites or active sites on the surface of a platinum catalyst may decrease the catalytic effect or stop the catalytic activity, causing the deterioration of the cell performance. This is called catalyst poisoning. In order to prevent catalyst poisoning, a platinum-ruthenium alloy catalyst has attracted attention. Ruthenium is a hydrophilic substance on which hydroxyl groups are likely to be adsorbed. It is believed that ruthenium bonded with hydroxyl groups oxidizes to remove carbon monoxide adsorbed on the surface of platinum, enabling a platinum-ruthenium alloy catalyst to prevent the reduction in performance of a platinum catalyst. It has been supposed, however, that platinum and ruthenium can provide excellent catalytic properties only when they are used as an alloy.

A platinum-ruthenium alloy catalyst has been produced by precipitating platinum and ruthenium one by one or all at once and then burning them at a high temperature (for example, at 180° C. or higher) in an inert gas or a hydrogen gas (see, for example, JP 09 (1997)-153366 A and JP 2002-102699 A).

However, there is a problem that burning at a high temperature for alloying makes catalyst particle size larger and reduces the surface area per unit mass of the catalyst, which causes the reduction in catalytic properties. In addition, a conventional noble metal particle is produced so that the particle is covered with a protective colloid. Therefore, this protective colloid has to be removed by high-temperature burning in order to use the particle as a catalyst, which causes another problem that this high-temperature burning makes the catalyst particle size still larger.

In consideration of the above-mentioned situation, the present inventors have suggested recently, in WO 2005/030416 A1, a platinum-ruthenium-based noble metal particle that is produced while preventing the catalyst particle size from becoming larger without the need for high-temperature burning for production. In this noble metal particle, ruthenium-platinum alloy particles are deposited on the surface of a platinum particle.

According to the conventional noble metal particle disclosed in WO 2005/030416 A1, the reduction in the catalyst properties can be inhibited by preventing the particle size from becoming larger. However, there is still room for improvement in its methanol-oxidation property.

DISCLOSURE OF INVENTION

It is an object of the present invention to provide a noble metal particle with an improved methanol-oxidation property. It is another object of the present invention to provide a process suitable for production of this noble metal particle. It is still another object of the present invention to provide a support and a colloidal solution including this noble metal particle.

The noble metal particle according to the present invention includes a platinum particle and ruthenium particles that are deposited on only part of the surface of the platinum particle.

The present invention provides, as a process suitable for producing the above-mentioned noble metal particle, a process of producing a noble metal particle, including the steps of precipitating the platinum particle out of a solution by reducing a platinum salt contained in the solution; and precipitating the ruthenium particles out of the solution containing the platinum particle so that the ruthenium particles are deposited on only part of the surface of the platinum particle, by adding a ruthenium salt into the solution and reducing the ruthenium salt after the reduction of the platinum salt in the solution is essentially completed.

Another aspect of the present invention provides a support on which the above-mentioned noble metal particle is placed on the surface of a carbon substrate. Still another aspect of the present invention provides a colloidal solution including the above-mentioned noble metal particle that is not covered with a protective colloid.

According to the present invention, it is possible to provide a noble metal particle with an improved methanol-oxidation property, compared with a conventional noble metal particle.

BEST MODE FOR CARRYING OUT THE INVENTION

Since the noble metal particle according to the present invention contains ruthenium particles deposited on only part of the surface of a platinum particle, it is possible to alleviate the effect of carbon monoxide poisoning on a platinum particle due to the carbon monoxide removing property of ruthenium, while securing the catalytic activity of the platinum particle.

In the noble metal particle, ruthenium particles can be placed directly on the surface of a platinum particle, practically without the platinum-ruthenium alloy layer in-between.

As shown in Examples to be described below, as the ratio of ruthenium of ruthenium particles to platinum of a platinum particle contained in a noble metal particle increases from 0.15 toward 0.4, the methanol oxidation property of the noble metal particle increases due to the increase in the carbon monoxide removing property of ruthenium in accordance with the increase in the percentage of ruthenium contained. On the contrary, as the above-mentioned ratio increases from 0.4 toward 0.8, the exposed surface area of the noble metal particle decreases, and thereby the methanol oxidation property of the noble metal particle becomes lower than the best level.

As described above, it is desirable, from the viewpoint of the methanol oxidation property, that the above ratio be in the range between 0.15 and 0.8, preferably between 0.2 and 0.6, more preferably between 0.25 and 0.5, and most preferably between 0.3 and 0.45, as shown in Examples to be described below.

Preferably, the noble metal particle is produced by adding a ruthenium salt and reducing the ruthenium salt so that the ratio of precipitated ruthenium of ruthenium particles to platinum of a platinum particle falls within a range between 0.15 and 0.8 in terms of molar ratio.

Preferably, the production of the noble metal particle further includes a step of reducing the amount of oxygen dissolved in a solution or the solvent of the solution. This step can be carried out by, for example, boiling the solution or the solvent thereof for a long time or boiling and refluxing it so that the amount of oxygen dissolved in the solution or the solvent of the solution is reduced until the solution or the solvent thereof essentially does not contain oxygen. This step may be carried out at any time before the reduction of a platinum salt. That the solution or the solvent thereof essentially does not contain oxygen means that a very small amount of oxygen is permitted to be left in the solution or the solvent thereof to the extent that it does not affect the reduction of a platinum salt and a ruthenium salt.

Adding a ruthenium salt after the reduction of a platinum salt in the solution essentially is completed means that a platinum salt in a solution is reduced until no or little platinum is present therein when a ruthenium salt is reduced to precipitate ruthenium particles. In other words, a very small amount of platinum is permitted to be precipitated together with ruthenium to the extent that it does not affect the carbon monoxide removing effect of ruthenium.

If a noble metal particle is produced in the above manner, it is possible to provide a noble metal particle that is not covered with a protective colloid, namely, which does not have a protective colloid, without burning the noble metal particle at a high temperature. Furthermore, if a noble metal particle is produced in the above manner, ruthenium preferentially is precipitated through reduction at the active sites on the surface of a platinum particle, which makes it easier to precipitate ruthenium particles so that they are deposited on only part of the surface of the platinum particle.

A support obtained by placing the noble metal particles of the present invention on the surface of a carbon substrate is suitable for a fuel cell electrode, for example. The support can be produced using a conventional method such as a dipping method and a spraying method, in which a colloidal solution containing the noble metal particles of the present invention is applied to the surface of the carbon substrate and then dried. The noble metal particles that are not covered with protective colloids can exist in this colloidal solution.

The following examples are given to further illustrate the present invention.

EXAMPLE 1

5 mL of pure water obtained by ion exchange and ultrafiltration was added to 0.7 g of hydrogen hexachloroplatinate hexahydrate that is a platinum chloride to prepare an aqueous solution of hexachloroplatinate. 5 mL of this pure water was added to 0.21 g of ruthenium chloride hydrate ($RuCl_3 \cdot 3H_2O$) that is a ruthenium chloride to prepare an aqueous solution of ruthenium chloride. Also, this pure water was added to sodium citrate, which serves as a reducing agent, to prepare two types of redox solutions. More specifically, the first redox solution was prepared by adding 20 mL of pure water obtained by ion exchange and ultrafiltration to 1.1 g of sodium citrate, whereas the second redox solution was prepared by adding 20 mL of pure water obtained by ion exchange and ultrafiltration to 1.4 g of sodium citrate.

Dissolved oxygen was removed by boiling and refluxing 950 mL of pure water. 20 minutes after the start of boiling, the first redox solution was added to the pure water from which the dissolved oxygen has been removed, and then the resultant solution was boiled and refluxed for more 20 minutes. Subsequently, an aqueous solution of hexachloroplatinate was added, and boiling and refluxing were continued so that the reduction reaction of platinum proceeded. Thereby, all the added platinum essentially was reduced.

The second redox solution further was added 1.5 hour after the addition of an aqueous solution of hexachloroplatinate. 5 minutes later, an aqueous solution of ruthenium chloride was added, and boiling and reduction reaction were continued for 25 hours, and then the resultant solution was quenched to room temperature so as to obtain a reaction solution.

The reaction solution was passed through a column filled with ion exchange resin MB-1 (made by Organo Corporation) so as to remove the metal ions and the reducing agent remaining in the reaction solution, and thereby a colloidal solution containing noble metal particles (platinum-ruthenium particles) was obtained.

The noble metal particles were obtained by dehydrating this colloidal solution. The ratio between platinum and ruthenium in the noble metal particle was expressed as Pt:Ru=1: 0.28 in terms of molar ratio.

EXAMPLE 2

A noble metal particle was obtained in the same manner as in Example 1, except that the amount of hydrogen hexachloroplatinate hexahydrate to be used for preparing an aqueous solution of hexachloroplatinate was changed from 0.7 g to 0.62 g, and that a redox solution prepared by adding 40 mL of pure water obtained by ion exchange and ultrafiltration to 2.9 g of sodium citrate was used in place of the first redox solution and the second redox solution.

The ratio between platinum and ruthenium in the noble metal particle was expressed as Pt:Ru=1:0.4 in terms of molar ratio.

EXAMPLES 3 TO 11

A noble metal particle was obtained in Examples 3 to 7, 10 and 11 in the same manner as in Example 1, and in Examples 8 and 9 in the same manner as in Example 2, except that the amount of hydrogen hexachloroplatinate hexahydrate to be added was adjusted so that the ratio of ruthenium to platinum in a noble metal particle attains the ratio as shown in Table 1.

COMPARATIVE EXAMPLE 1

Comparative Example 1 is an example in which the experiment as described in Example 1 of WO 2005/030416 A1 was repeated.

50 mL of pure water obtained by ion exchange and ultrafiltration was added to 0.195 g of hydrogen hexachloroplatinate hexahydrate to prepare an aqueous solution of hexachloroplatinate. 50 mL of this pure water was added to 0.1 g of ruthenium chloride hydrate ($RuCl_3 \cdot 3H_2O$) to prepare an aqueous solution of ruthenium chloride. Also, 50 mL of this pure water was added to 3 g of sodium citrate to prepare a redox solution.

Dissolved oxygen was removed by boiling and refluxing 850 mL of pure water. 20 minutes after the start of boiling, the redox solution was added to the pure water from which the dissolved oxygen has been removed, and then the resultant solution was boiled and refluxed for more 20 minutes. Subsequently, an aqueous solution of hexachloroplatinate was added, and 2 minutes later, an aqueous solution of ruthenium chloride further was added, and boiling and refluxing were continued for 1 hour. Then, the resultant solution was quenched to room temperature so as to obtain a reaction solution.

The noble metal particles were obtained from the reaction solution in the same manner as in Example 1. The ratio between platinum and ruthenium in the noble metal particle was expressed as Pt:Ru=1:1 in terms of molar ratio.

COMPARATIVE EXAMPLE 2

Comparative Example 2 is an example in which a noble metal particle made of platinum only was provided.

50 mL of pure water obtained by ion exchange and ultrafiltration was added to 0.4 g of hydrogen hexachloroplatinate hexahydrate to prepare an aqueous solution of hexachloroplatinate. 50 mL of pure water was added to 1 g of sodium citrate to prepare a redox solution.

Dissolved oxygen was removed by boiling and refluxing 900 mL of pure water. 20 minutes after the start of boiling, the redox solution was added to the pure water from which the dissolved oxygen has been removed, and then the resultant solution was boiled and refluxed for more 20 minutes. Subsequently, an aqueous solution of hexachloroplatinate was added, and boiling and refluxing were continued for 1 hour. Then, the resultant solution was quenched to room temperature so as to obtain a reaction solution.

The noble metal particles were obtained from the reaction solution in the same manner as in Example 1.

COMPARATIVE EXAMPLE 3

A noble metal particle was obtained in the same manner as in Example 1, except that the amount of hydrogen hexachloroplatinate hexahydrate to be added was adjusted so that the ratio of ruthenium to platinum in a noble metal particle is expressed as Pt:Ru=1:0.66 in terms of molar ratio.

(Evaluation of Electrochemical Properties)

Figure 1:
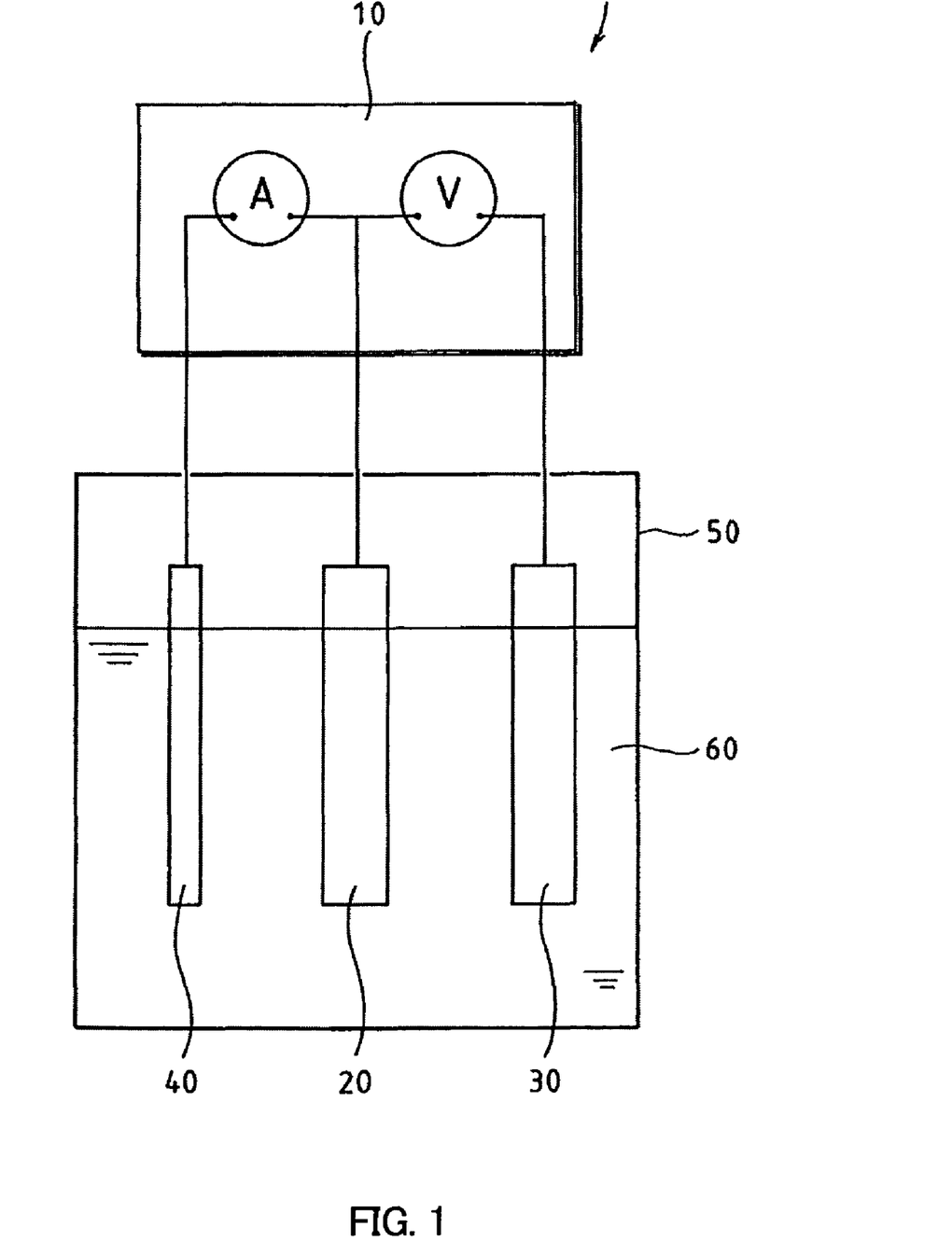
FIG. 1 is a schematic view of an electrochemical measurement device for evaluating the methanol-oxidation property of a noble metal particle.

Using an electrochemical measurement device 1 in which a working electrode 20 provided as described later, a reference electrode (Ag/AgCl electrode) 30 and a counter electrode 40 are connected to an electrochemical analyzer 10 (made by BAS Co. Ltd.), potential sweep was carried out with these electrodes being dipped in an electrolyte solution 60 consisting of 1 M of $CH_3OH$ and 0.5 M of $H_2SO_4$ contained in a beaker 50, so as to evaluate the methanol-oxidation property of a noble metal particle (to be described later in detail).

Figure 2:
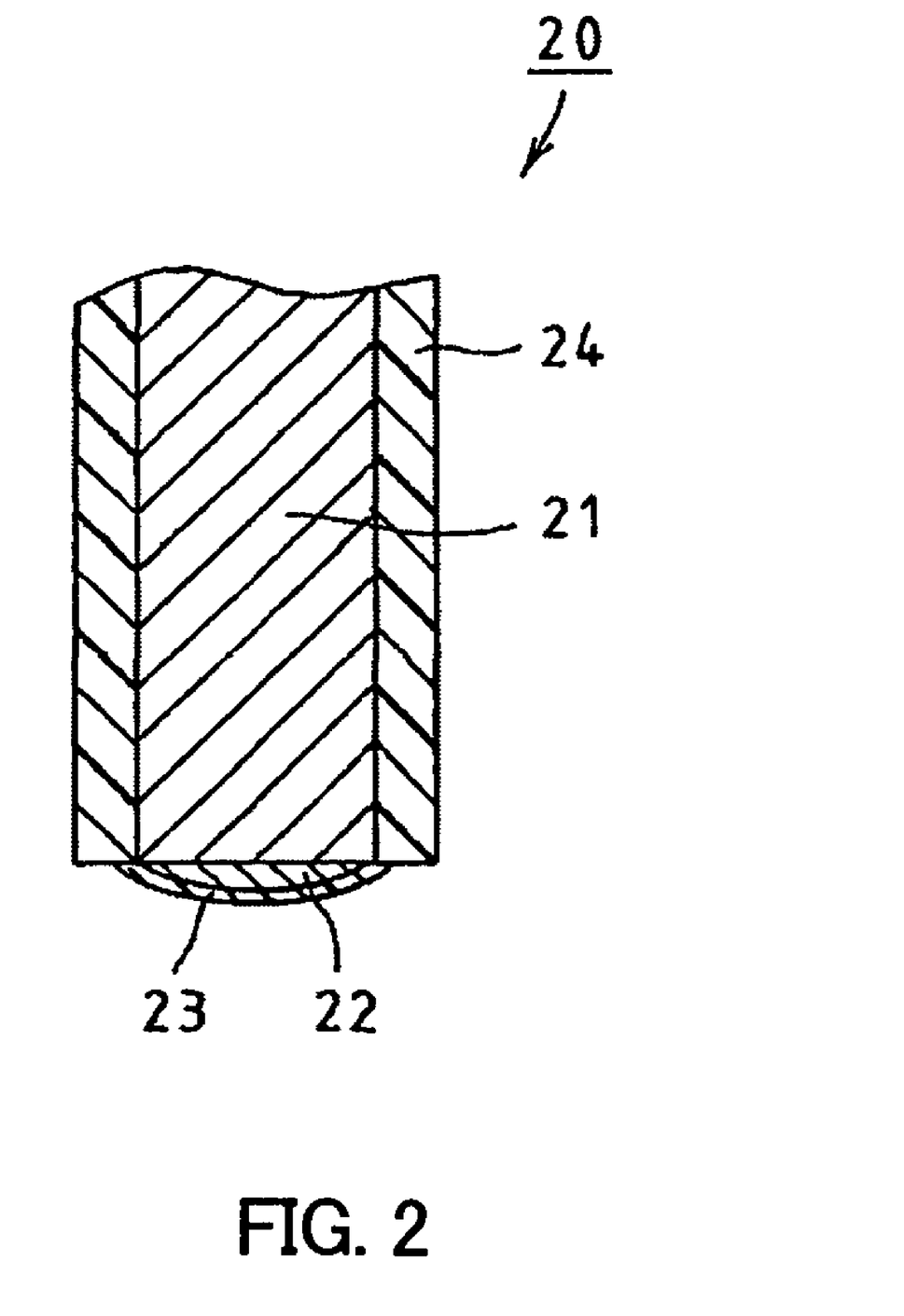
FIG. 2 is a sectional view of the vicinity of the tip of a working electrode in the measurement device in FIG. 1.

FIG. 2 is a sectional view of the vicinity of the tip of the working electrode. As shown in FIG. 2, in the working electrode 20, noble metal particles 22 are placed on the surface in the vicinity of the tip of a glassy carbon electrode 21, an electrolyte membrane 23 is disposed so as to cover the noble metal particles 22, and a resin layer 24 is disposed so as to cover the side of the electrode 21.

The working electrode was provided in the following manner. First, a colloid solution containing the noble metal particles obtained in Examples 1 to 11 and Comparative Examples 1 and 2 were applied to respective glassy carbon electrodes and dried, and thereby the noble metal particles were fixed on the electrode. Then, a solution-state Nafion® (made by DuPont Corporation) was applied to cover the noble metal particles and dried, so as to form the electrolyte membrane.

The methanol-oxidation properties were compared based on the peak current value (A/g) of an oxidation current per gram of platinum. It should be noted that the measurement was carried out at room temperature and the sweep speed was 1 mV/sec. In a noble metal particle, platinum is mainly responsible for catalytic activity, whereas ruthenium is present to give the resistance to poisoning. Therefore, the catalytic effect of a noble metal particle can be evaluated based on the peak current value per gram of platinum. Table 1 shows the evaluation results.

TABLE 1

| Sample | Peak value of oxidation current (A/g) | Molar ratio of Ru to Pt | Process to be followed |
|---|---|---|---|
| Example 1 | 155 | 0.28 | |
| Example 2 | 194 | 0.4 | |
| Example 3 | 140 | 0.27 | Example 1 |
| Example 4 | 177 | 0.34 | Example 1 |
| Example 5 | 192 | 0.37 | Example 1 |
| Example 6 | 157 | 0.43 | Example 1 |
| Example 7 | 110 | 0.47 | Example 1 |
| Example 8 | 130 | 0.56 | Example 2 |
| Example 9 | 97 | 0.53 | Example 2 |
| Example 10 | 78 | 0.62 | Example 1 |
| Example 11 | 54 | 0.64 | Example 1 |
| Comparative Example 1 | 26 | 1.0 | |
| Comparative Example 2 | 10 | 0 | |
| Comparative Example 3 | — | 0.66 | Comparative Example 1 |

Figure 3:
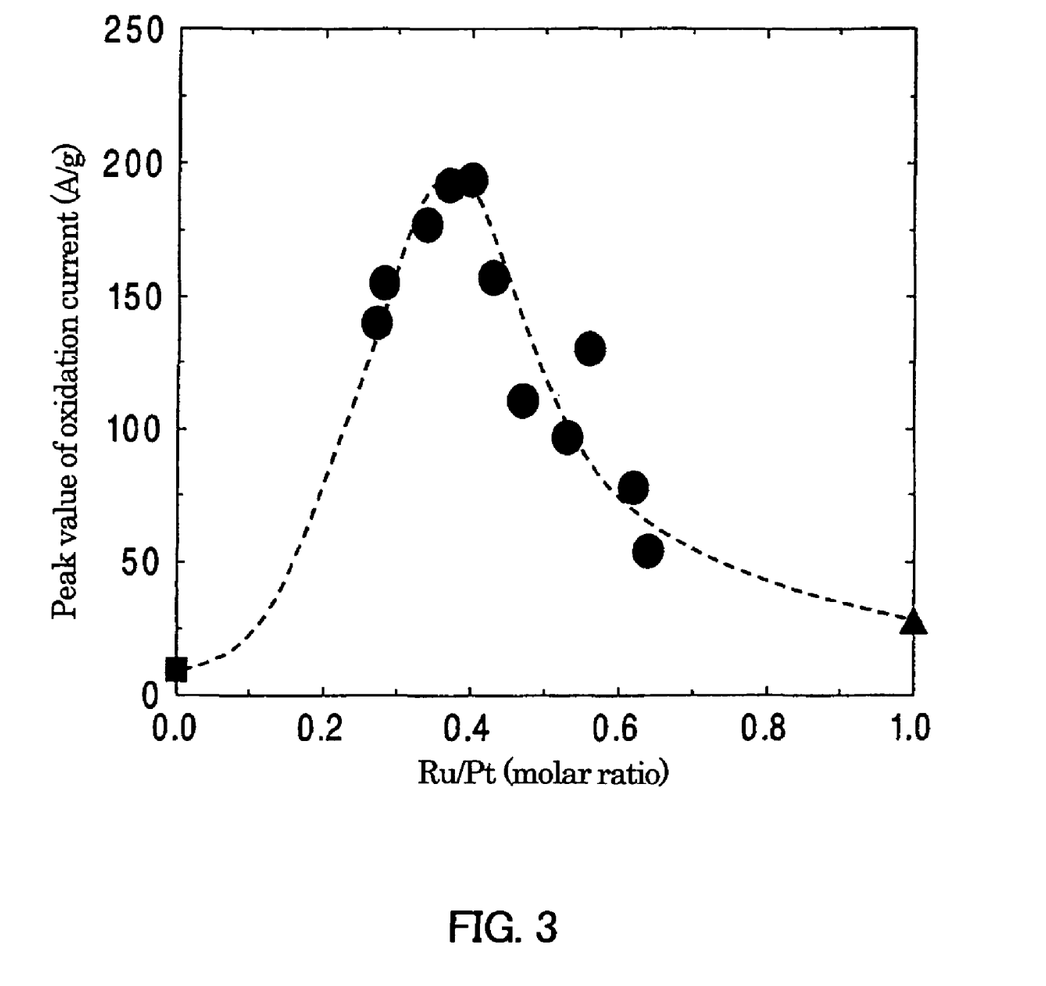
FIG. 3 is a graph showing a relationship between a ratio of ruthenium to platinum in a noble metal particle and a peak value of an oxidation current of methanol measured by the measurement device in FIG. 1.

FIG. 3 is a graph showing the relationship between: the peak values of oxidation current which were measured by the working electrode using the noble metal particles as shown in Examples 1 to 11 and Comparative Examples 1 and 2 and then converted to per gram of platinum; and the ratios of ruthenium to platinum contained in these noble metal particles.

As shown in FIG. 3, it was found that the above-mentioned peak value of oxidation current is 40 amperes or greater when the ratio of ruthenium to platinum is in a range between 0.15 and 0.8 in terms of molar ratio. It was further found that the above-mentioned peak values of oxidation current are 75 amperes or greater, 110 amperes or greater, and 150 amperes or greater, respectively, when these ratios are in a range between 0.2 and 0.6, a range between 0.25 and 0.5, and a range between 0.3 and 0.45 in terms of molar ratio. It was found that 0.4 of this ratio, in particular, achieves the best balance between the catalytic activity of platinum and the carbon monoxide removing activity of ruthenium, thereby maximizing the above-mentioned peak value of oxidation current.

FIGS. 4 through 7 are graphs showing the CV (Cyclic Voltammogram) curves of a platinum particle, a ruthenium particle, a noble metal particle in Comparative Example 3, and a noble metal particle in Example 7, respectively. The CV curves were obtained by carrying out potential sweep in the same manner as for the graph shown in FIG. 3, except that a working electrode provided using the respective particles and an electrolyte solution consisting of 0.5 M of $H_2SO_4$ were used. It should be noted that the measurement was carried out at room temperature, the voltages to be swept were 0.05 to 1.0 V (vs. SHE), and the sweep speed was 1 mV/sec.

Figure 4:
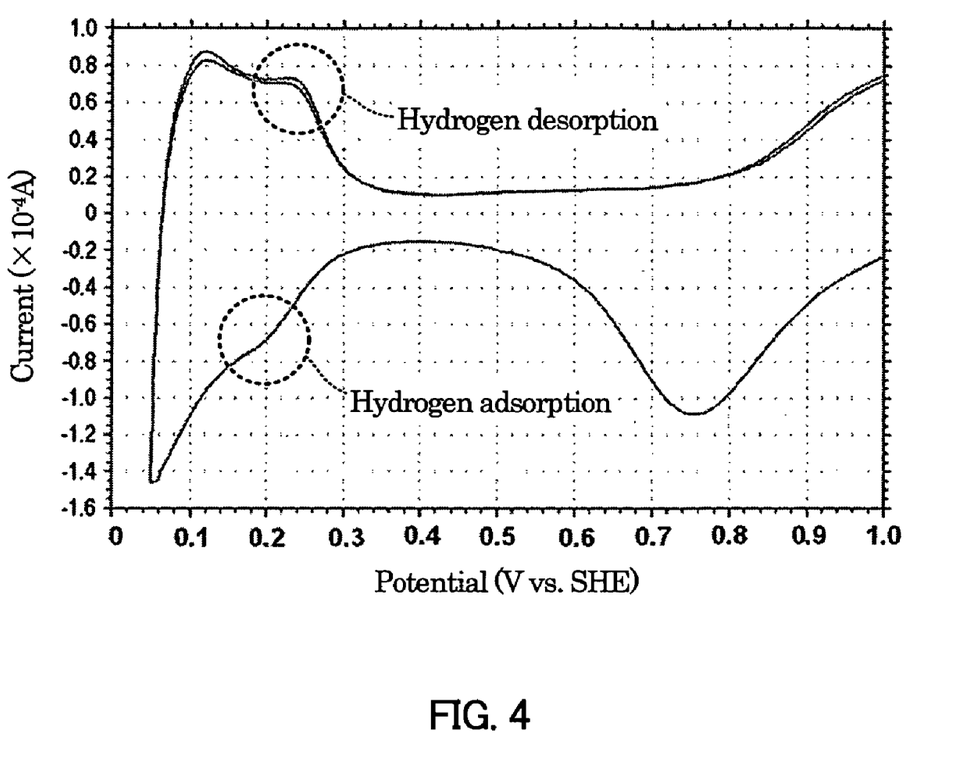
FIG. 4 is a graph showing a CV curve of a platinum particle.
Figure 5:
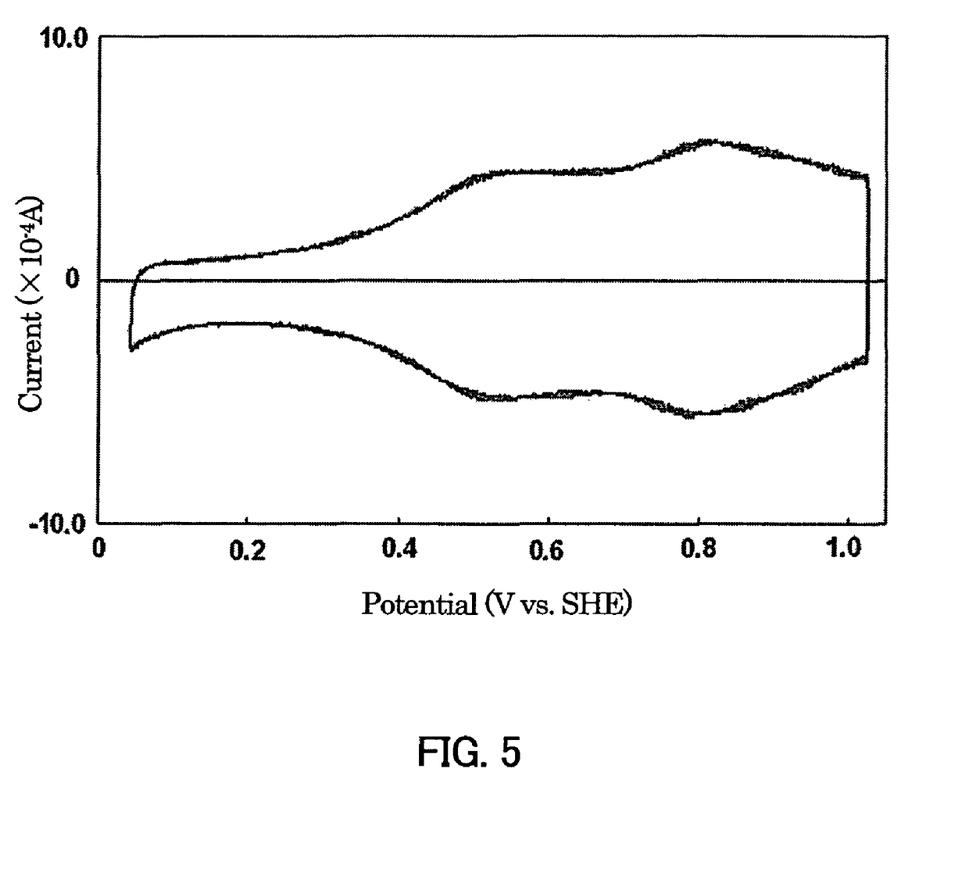
FIG. 5 is a graph showing a CV curve of a ruthenium particle.
Figure 6:
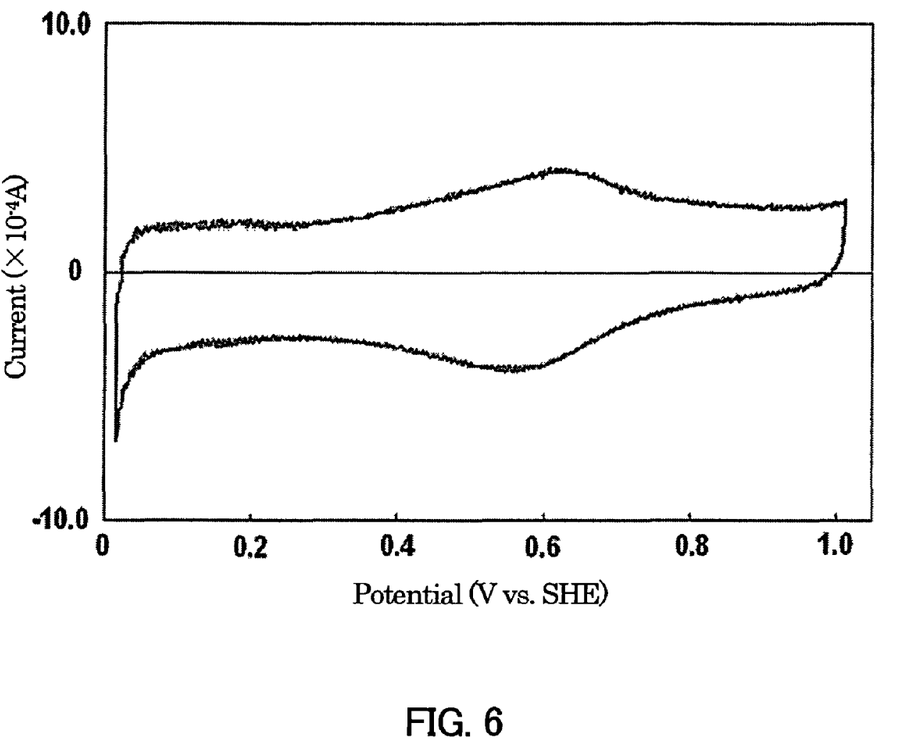
FIG. 6 is a graph showing a CV curve of a noble metal particle in Comparative Example 3.

As for the platinum particle, as shown in FIG. 4, the CV curve having a shoulder peak was obtained at around 0.2 V. It is considered that hydrogen adsorption-desorption on platinum creates this shoulder peak. The above shoulder peak was not observed, as shown in FIGS. 5 and 6, in the CV curves for the ruthenium particle and noble metal particle in Comparative Example 3.

As described above, the noble metal particle in Comparative Example 3 had a weakened intrinsic property of platinum. Although it is not clearly known at this time why this occurred, the present inventors attribute this to eutectoid of ruthenium and platinum provided on the surface of the platinum particle.

Figure 7:
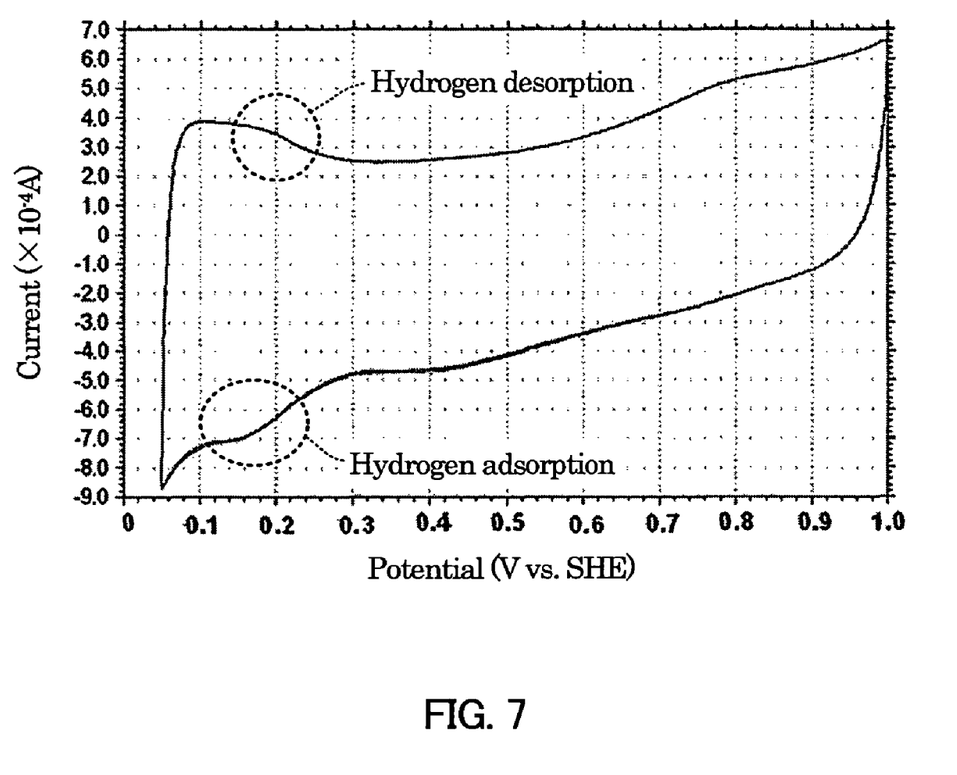
FIG. 7 is a graph showing a CV curve of the noble metal particle of the present invention.

Meanwhile, as for the noble metal particle of the present invention, a shoulder peak was observed at around 0.2 V, as shown in FIG. 7, and the intrinsic property of platinum was maintained. This means that in the noble metal particle of the present invention, no eutectoid of ruthenium and platinum is provided on the surface of the platinum particle and ruthenium particles are deposited on only part of the surface of the platinum particle.

It should be noted that it is known that a CV curve of platinum shows, at around 0.2 V, a peak created by hydrogen adsorption-desorption on platinum. See, for example, J. Electrochem. Soc., Vol. 143, No. 5, p1685-1690 (1996), ibid Vol. 145, No. 7, p2354-2358 (1998).

INDUSTRIAL APPLICABILITY

The present invention provides a noble metal particle with an improved methanol-oxidation property. This noble metal particle can be suitably used, for example, as an electrode catalyst for a fuel cell.

The invention claimed is:

1. A noble metal particle consisting of:
   a platinum particle; and
   ruthenium particles that are deposited on only part of the surface of the platinum particle,
   wherein a ratio of ruthenium of the ruthenium particles to platinum of the platinum particle is in a range between 0.15 and 0.8 in terms of molar ratio.

2. The noble metal particle according to claim 1, wherein the ratio is in a range between 0.2 and 0.6 in terms of molar ratio.

3. The noble metal particle according to claim 2 wherein the ratio is in a range between 0.25 and 0.5 in terms of molar ratio.

4. The noble metal particle according to claim 3, wherein the ratio is in a range between 0.3 and 0.45 in terms of molar ratio.

5. The noble metal particle according to claim 1, wherein the noble metal particle is not covered with a protective colloid.

6. A process of producing a noble metal particle, where the noble metal particle comprises a platinum particle and ruthenium particles,
   the process comprising the steps of:
   precipitating the platinum particle out of a solution by reducing a platinum salt contained in the solution; and
   precipitating the ruthenium particles out of the solution containing the platinum particle so that the ruthenium particles are deposited on only part of the surface of the platinum particle, by adding a ruthenium salt into the solution and reducing the ruthenium salt after the reduction of the platinum salt in the solution essentially is completed.

7. The process of producing the noble metal particle according to claim 6, wherein the ruthenium salt is added and reduced so that a ratio of ruthenium of the precipitated ruthenium particles to platinum of the platinum particle is in a range between 0.15 and 0.8 in terms of molar ratio.

8. The process of producing the noble metal particle according to claim 6, further comprising the step of reducing the amount of oxygen dissolved in the solution or a solvent of the solution.

9. A support comprising a carbon substrate and the noble metal particle according to claim 1, wherein the noble metal particle is placed on the surface of the carbon substrate.

10. A colloidal solution comprising the noble metal particle according to claim 1, wherein the noble metal particle is not covered with a protective colloid.

11. The noble metal particle according to claim 1, wherein the ruthenium particles are precipitated through reduction at active sites of the platinum particle.

12. The noble metal particle according to claim 1, wherein the platinum particle is obtained by precipitating the platinum particle out of a solution by reducing a platinum salt contained in the solution, and the ruthenium particles deposited on only part of the surface of the platinum particle are deposited by adding a ruthenium salt into the solution and reducing the ruthenium salt after the reduction of the platinum salt in the solution essentially is completed.

13. A noble metal particle comprising:
   a platinum particle; and
   ruthenium particles that are deposited on only part of the surface of the platinum particle,
   wherein a ratio of ruthenium of the ruthenium particles to platinum of the platinum particle is in a range between 0.25 and 0.5 in terms of molar ratio.

14. A noble metal particle according to claim 13, wherein the ratio is in a range between 0.3 and 0.45 in terms of molar ratio.

* * * * *